United States Patent
Potonniee et al.

(10) Patent No.: US 9,742,745 B2
(45) Date of Patent: Aug. 22, 2017

(54) METHOD FOR COMMUNICATING BETWEEN A SERVER AND A CLIENT AND CORRESPONDING CLIENT, SERVER AND SYSTEM WHEREIN THE SERVER CONTROLS AN OPEN COMMUNICATION SESSION WITH THE CLIENT

(75) Inventors: Olivier Potonniee, Marseilles (FR); HongQian Karen Lu, Austin, TX (US)

(73) Assignee: GEMALTO SA, Meudon (FR)

( * ) Notice: Subject to any disclaimer, the term of this patent is extended or adjusted under 35 U.S.C. 154(b) by 184 days.

(21) Appl. No.: 13/978,302

(22) PCT Filed: Jan. 4, 2012

(86) PCT No.: PCT/EP2012/050104
§ 371 (c)(1),
(2), (4) Date: Oct. 11, 2013

(87) PCT Pub. No.: WO2012/093144
PCT Pub. Date: Jul. 12, 2012

(65) Prior Publication Data
US 2014/0040991 A1   Feb. 6, 2014

(30) Foreign Application Priority Data
Jan. 5, 2011   (EP) ..................... 11305010

(51) Int. Cl.
*H04L 29/06* (2006.01)
*H04L 9/32* (2006.01)
(52) U.S. Cl.
CPC ............ *H04L 63/06* (2013.01); *H04L 9/3271* (2013.01); *H04L 63/08* (2013.01)

(58) Field of Classification Search
CPC ........ H04L 63/06; H04L 9/3271; H04L 63/08
See application file for complete search history.

(56) References Cited

U.S. PATENT DOCUMENTS 7,031,110 B2    4/2006   Sue et al.
8,051,465 B1 *  11/2011  Martin .................... G06F 21/00
                                                          726/3

(Continued)

FOREIGN PATENT DOCUMENTS

JP    2005222321 A    8/2005
JP    2008216338 A    9/2006

OTHER PUBLICATIONS

International Search Report (PCT/ISA/210) issued on Mar. 1, 2012, by the European Patent Office as the International Searching Authority for International Application No. PCT/EP2012/050104.

(Continued)

*Primary Examiner* — Anthony Brown
*Assistant Examiner* — William Corum, Jr.
(74) *Attorney, Agent, or Firm* — Buchanan Ingersoll & Rooney PC (57) ABSTRACT

A method, corresponding client, server and system for communicating between a server and a client. The server and the client access at least one session extension key and/or a key associated with the session extension key, as an associated key. The server authorizes to extend an open communication session with the client until an expiration time only if the client sends to the server authentication data allowing the server to authenticate at least the client on a basis of the session extension key. The expiration time is a time at which the communication session is open completed by a predetermined extension time period.

10 Claims, 1 Drawing Sheet

(56) References Cited

U.S. PATENT DOCUMENTS

| | | | |
|---|---|---|---|
| 8,166,298 B2* | 4/2012 | Kim et al. | 713/169 |
| 8,255,539 B2* | 8/2012 | Pierlot et al. | 709/227 |
| 8,402,141 B2* | 3/2013 | Seraphin | H04L 63/08 |
| | | | 709/227 |
| 2008/0022377 A1* | 1/2008 | Chen et al. | 726/5 |
| 2008/0086771 A1 | 4/2008 | Li et al. | |
| 2008/0114983 A1* | 5/2008 | Sherkin et al. | 713/171 |
| 2008/0159318 A1* | 7/2008 | Pierlot | G06F 21/335 |
| | | | 370/412 |
| 2008/0195861 A1 | 8/2008 | Salomone | |
| 2008/0271121 A1* | 10/2008 | Hinton | H04L 63/0815 |
| | | | 726/4 |
| 2010/0023759 A1* | 1/2010 | Langer | 713/156 |
| 2010/0131761 A1* | 5/2010 | Kim et al. | 713/169 |
| 2010/0306547 A1* | 12/2010 | Fallows et al. | 713/178 |
| 2011/0231650 A1* | 9/2011 | Coulier | 713/151 |
| 2011/0252465 A1* | 10/2011 | Miller et al. | 726/8 |

OTHER PUBLICATIONS

Written Opinion (PCT/ISA/237) issued on Mar. 1, 2012, by the European Patent Office as the International Searching Authority for International Application No. PCT/EP2012/050104.

* cited by examiner

METHOD FOR COMMUNICATING BETWEEN A SERVER AND A CLIENT AND CORRESPONDING CLIENT, SERVER AND SYSTEM WHEREIN THE SERVER CONTROLS AN OPEN COMMUNICATION SESSION WITH THE CLIENT

FIELD OF THE INVENTION

The invention relates, in a general manner, to a method for communicating between a server and a client.

Furthermore, the invention also pertains to a server for communicating with a client.

Moreover, the invention concerns, as well, a client for communicating with a server.

Finally, the invention also relates to a communicating system comprising a server and a client.

STATE OF THE ART

A known solution for communicating between a (web) server and a client is based upon a sending, from the client, of a request for connecting to the server that sends back to the client a (web) page, as response to the request. The client is executed by a host computer. Once connected to the server, a computer user has to close a thus open (web) communication session between the server and the client by depressing a dedicated button.

However, if the computer user does not depress the button, then the open communication session is not closed. The open communication session is therefore still open for (an) unauthorized and possibly malicious user(s) and/or application(s).

Thus, there is a need for communicating, in a secure manner, between the server and the client.

SUMMARY OF THE INVENTION

The invention proposes a solution for satisfying the just hereinabove specified need by providing a method for communicating between a server and a client.

According to the invention, the server and the client accessing at least one session extension key and/or one key associated with the session extension key, as associated key, the server authorizes to extend an open communication session with the client until an expiration time only if the client sends to the server authentication data allowing the server to authenticate at least the client on a basis of the session extension key, the expiration time being a time at which the communication session is open completed by a predetermined extension time period.

The principle of the invention consists in a transmission, from the client to the server, of data allowing the server to control the open communication session with the client and, if the server authenticates the client, the server authorizes to continue the session for a predefined continuation time period.

Otherwise, i.e. if the server does not authenticate the client, then the server forbids the client to continue the open communication session, i.e. stops it.

It is to be noted that the authentication is possible thanks to either one key, termed session extension key, or another key associated with the session extension key shared between the server and the client and allowing the server and/or the client to generate expected authentication data.

The invention method allows extending securely an open communication between the server and the client, i.e. when the server effectively authenticates the client.

A user of a host computer device, as terminal, that executes the client does not need to be involved.

In particular, contrary to the herein above specified known solution, the terminal user does not have to close explicitly the open communication session, since the invention method allows closing automatically the session by not providing the server with data authenticating notably the client.

The invention method is therefore convenient for the user who does not need to be involved.

According to an additional aspect, the invention is a server for communicating with a client.

According to the invention, the server accessing at least one session extension key, the server is adapted to authorize to extend an open communication session until an expiration time only if the server receives authentication data allowing to authenticate at least the client on a basis of the session extension key, the expiration time being a time at which the communication session is open completed by a predetermined extension time period.

According to still an additional aspect, the invention is a client for communicating with a server.

According to the invention, the client accessing at least one session extension key and/or one key associated with one session extension key, as an associated key, the client is adapted to extend an open communication session until an expiration time if the client sends to the server authentication data allowing to authenticate at least the client on a basis of the session extension key, the expiration time being a time at which the communication session is open completed by a predetermined extension time period.

According to still an additional aspect, the invention is a communicating system comprising a server and a client.

According to the invention, the server and the client accessing at least one session extension key and/or one key associated with one session extension key, as an associated key, the server is adapted to authorize to extend an open communication session until an expiration time only if the server receives authentication data allowing to authenticate at least the client on a basis of the session extension key, the expiration time being a time at which the communication session is open completed by a predetermined extension time period.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered a chip carried by a card, as a chip medium and token.

The chip may be nevertheless carried by any other medium that may have different form factors.

Within the present description, a token, also termed secure element, is an electronic object that is intended to, on the one hand, communicate data with the outside world and, on the other hand, carry out preferentially at least one security operation, such as a protection of the data that the token stores.

Instead of being a chip carried by a card, as medium, the token may be an Embedded Secure Element, as a chip soldered, possibly in a removable manner, on a Printed Circuit Board (or PCB) of a host computer device.

Instead of being carried by a card, the token may be carried by another medium, such as a dongle, for example, of the Universal Serial Bus (or USB) type.

Naturally, the herein below described embodiment is only for exemplifying purposes and is not considered to reduce the scope of the present invention.

Figure 1:
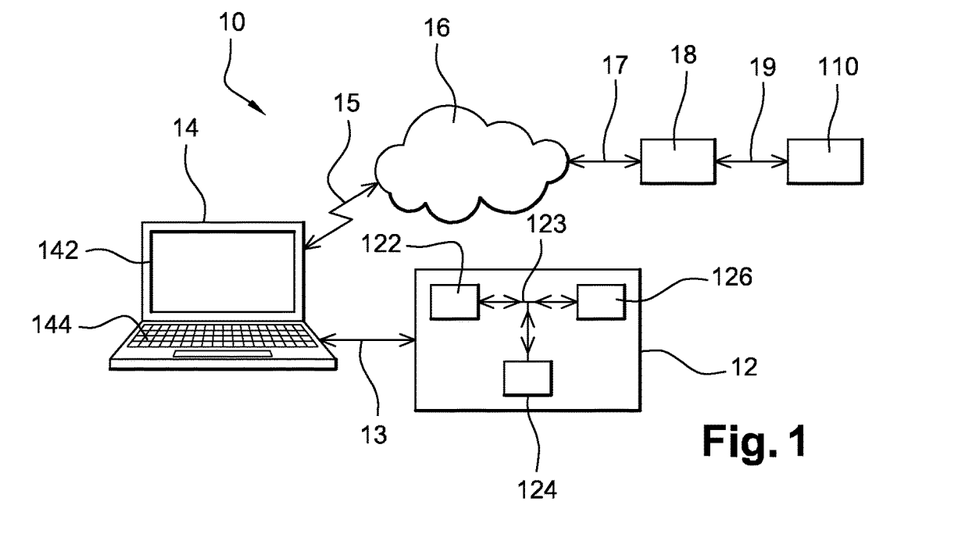
FIG. 1 illustrates a simplified diagram of one exemplary embodiment of a system comprising a Personal Computer (or PC), as terminal, that executes a (web) browser, as client, a chip card, as token, coupled to the PC, and a server, the system being adapted, once a communication session between the server and the client is open, to communicate securely between the server and the client while involving the token to generate expected authentication data, according to the invention.

FIG. 1 shows schematically a system 10 for communicating between a client run by a PC 14 and a (web) server run by a computer, also termed server 18.

The system 10 includes a chip card 12, the PC 14, as terminal, and the server 18.

For a sake of conciseness, the chip card 12 is termed hereinafter the token 12.

The token 12 is coupled to the PC 14.

Instead of being constituted by a PC, the terminal may be constituted by, for example, a mobile telephone, a smart phone (i.e. a mobile phone with a Personal Digital Assistant (or PDA) capability), a set-top box, a tablet computer, a desktop computer, a laptop computer, a video player, an audio player, a media-player, a game console, a netbook and/or a PDA.

For the sake of simplicity, only one PC 14, as client device and terminal, which executes a (web) browser application and only one token coupled to the PC 14 have been represented.

However, several PCs, as client devices, may communicate, at the same time or at different times, with the server 18, so as to access one or several services provided by the server 18.

The PC 14, as host computer device, may accommodate a plurality of tokens.

The browser application may be, as well-known, a Microsoft Internet Explorer (registered trademark) or a Mozilla Firefox (registered trademark) application.

The browser application of the client device plays a role of a client that attempts to load one or several (web) pages from the server 18.

According to an alternative, instead of the browser application, the client is a proprietary application, i.e. an application that is typically only accessible by an issuer (or provider) of the considered application.

The service(s) provided by the server 18 may satisfy Word Wide Web Consortium (or W3C) type rules.

The PC 14 is connected to, through a contact or contact-less bi-directional link 15, at least one communication network 16.

As contact link, it may be a wire link.

As contact-less link, it may be constituted by a link of a Wifi (registered trademark) or Bluetooth (registered trademark) type, as a radio-frequency link with a rather short range (typically up to 10 m).

The PC 14 includes at least one microprocessor (not represented), at least one memory (not represented) and at least two Input/Output (or I/O) interfaces (not represented).

The PC I/O interface comprises preferably a display screen 142 and a keyboard 144, as Man Machine Interface (or MMI), so as to interact with a PC user that desires to benefit from the service(s) supplied by the server 18.

The PC I/O interface includes one I/O interface for exchanging data, via the communication network 16, with the server 18. The PC I/O interface with the server 18 may use a HyperText Transfer Protocol (or HTTP), a File Transfer Protocol (or FTP) and/or another data communication protocol(s), so as to communicate with the server 18.

The PC 14 is equipped with a card reader (not represented), so that the PC 14 is able to interact with the token 12 inserted within the card reader.

The PC I/O interface also includes one I/O interface, such as a Personal Computer/Smart Card (or PC/SC) interface, for exchanging data with the token 12.

An application or a software component executed by the PC 14 exchanges with an application or a software component executed by the token 12 while using preferably Application Protocol Data Unit (or APDU).

The PC I/O interface with the token 12 may use a Single Wire Protocol (or SWP), an Internet Protocol (or IP), a USB protocol, a Bearer Independent Protocol (or BIP) and/or another data communication protocol(s).

The PC memory stores preferably a browser application and a script engine.

The PC memory may store a private key associated with a so-termed session extension key, as an associated public key.

The PC microprocessor processes data originating from and/or intended to any internal component and data originating from and/or intended to any external device through one PC I/O interface.

The PC microprocessor executes notably, besides an Operating System (or OS), the browser application, as client, and preferably the script engine, as script interpreter, that is accessible from the client.

The PC microprocessor executes preferably a cryptographic Hash function, like, for example, Secure Hash Algorithm (or SHA) −1, so as to generate a fixed size bit string, as a cryptographic hash value or termed (message) digest. The cryptographic Hash function allows reducing a size of data, such as a random (as a challenge), as an input to the cryptographic Hash function. The digest, as corresponding output from the cryptographic Hash function, thanks to its fixed size, may thus be used by the token 12, as an entity with weaker data processing capacities than the data processing means of the PC 14.

The PC microprocessor executes preferably, after the cryptographic Hash function, a formatting function, like, for example, Encoding Methods for Signatures with Appendix-Probabilistic Signature Schemes (or EMSA-PSS) as defined in PKCS#1 v2.1, so as to format the digest, as input to the formatting function. The formatting function may be a function of encoding the input in a format interpretable by the token 12, when the token 12 supports the authentication application.

A script is a character string and constitutes executable data. The script is embedded within a (web) page, such as a page that is written in a HyperText Markup Language (or HTML). The script is constituted by, for example, a Javascript (registered trademark), an ActiveX (registered trademark) or an Adobe (registered trademark) type script.

The script engine interprets and executes dynamically, i.e. during the communication open with the server 18, at least in part the script.

According to an interesting feature of the invention, the PC 14, and more exactly the client (application), is adapted to send to the server 18 (application) data for authenticating, before the server 18, at least the client, as an authorized interlocutor of the server 18, so as to extend or prolong an open communication session with the server 18 for a predefined extension time period.

When the communication session is allowed to be extended for a first time, the communication session is extended, once by the predefined extension time period, to an expiration time corresponding to a time at which the communication session is open completed by one extension time period.

When the communication session is allowed for at least another time, the communication session is extended at least by the predefined extension time period from the last calculated expiration time. The open communication session may be thus periodically extended while the client sends to the server 18 expected authentication data.

Any request issued by the client is processed by the server 18 while the expiration time has not elapsed.

As soon as the client, possibly with a help of another software component and/or another application executed by the PC 14 and/or the token 12, does not submit expected authentication data, the server 18 closes the open communication session at the end of a last calculated expiration time.

To generate authentication data, the PC 14 may be adapted to access preferably a private key associated with the session extension key, as an associated public key.

According to another embodiment, instead of being a public key, the session extension key is a secret key. The secret key may be previously either shared between the server 18 and the client or generated from other secret data shared between the server 18 and the client. The secret data may be a mother key, from which a daughter key is generated thanks to a predetermined algorithm, such as, for example, the Key Derivation Function 1 (or KDF1) as described notably at http://www.di-mgt.com.au/crptoKDFs.html. The secret data may alternatively be generated by using either a secret key combined with a counter, as two inputs to a generation algorithm, like, for example, an Open AuTHentication (or OATH) Hash based Message Authentication Code (or HMAC) based One Time Password (or HOTP) algorithm/Internet Engineering Task Force Request For Comments (or IETF RFC) 4226, or a secret key combined with a timestamp, as two inputs to a generation algorithm, like, for example, an OATH Time based One Time Password (or TOTP) algorithm.

According to a preferred embodiment, the client delegates to the script engine an interpretation of a script issued by the server 18, so as to address to the token 12 executable data comprised within the script, intended to the token 12, and allowing the token 12 to generate authentication data, as a cryptogram or a result of a cryptographic computation.

Alternately, the client delegates to the script engine an interpretation of a script issued by the server 18, so as to address to an authentication application to be executed by the PC 14 executable data comprised within the script, intended to the PC 14, and allowing the PC 14 to generate authentication data. The authentication application supported by the PC 14 may be constituted by a library. Contrary to the preferred embodiment in which an authentication application is supported by a device microprocessor, namely a token 12 microprocessor, different from the PC 14 microprocessor, the PC 14 supports the authentication application dedicated to generating authentication data. Before generating authentication data, the PC 14 may be adapted to generate or let generate a challenge by using previously shared secret data with the server 18. The secret data may be generated by using either a secret key combined with a counter, as two inputs to a generation algorithm, like, for example, an OATH HOTP algorithm of IETF RFC 4226, or a secret key combined with a timestamp, as two inputs to a generation algorithm, like, for example, an OATH TOTP algorithm. The challenge is then used to generate corresponding authentication data.

According to a preferred embodiment, the PC 14, and more exactly the client is adapted to send to the server 18 a request, as a challenge request, for generating and obtaining a challenge for each time extension of the open communication session. Preferably, the client delegates to the script engine an interpretation of a script issued by the server 18, so as to address to the server 18 a challenge request comprised within the script, and allowing the server 18 to generate a challenge and send back the generated challenge.

Alternatively, the client delegates to the script engine an interpretation of a script issued by the server 18, so as to address to the token 12 and the server 18 executable data comprised within the script and allowing the token 12 and the server 18 to generate independently a challenge. To generate a challenge, each of the token 12 and the server 18 uses previously shared secret data, like a secret key combined with a counter (as defined in OATH HOTP/IETF RFC4226) or a timestamp (as defined in OATH TOTP), and a predetermined algorithm, such as a One-Time Password (or OTP) generation algorithm, like a Hash based Message Authentication Code (or HMAC) based OTP (or HOTP).

To generate the authentication data, the token 12 (or the PC 14) and the server 18 side may use, besides a generated challenge, the session extension key or the associated key and a predetermined algorithm, contextual information.

The token 12 may store, preferably in a secure manner, the contextual information.

As contextual information, there may be information relating to the server 18, such as an identifier of the server 18, like its IP address and/or a server domain name, and/or a user challenge, such as a success of a user authentication. The user authentication is preferably performed by the token 12 by verifying, for example, whether data input by the user matches with data stored (and/or generated) by the token 12, such as a Personal Identity Number (or PIN) and/or biometrics print.

According to a preferred embodiment, the token 12 is adapted to generate and provide the script with authentication data possibly while using a challenge generated by either the token 12 or the server 18. When generated by the server 18, the server 18 further provides the token 12 with the generated challenge. The generated authentication data is then supplied by the token 12, via the script, to the server 18.

The token 12 includes a chip. The chip comprises at least one memory 122, at least one I/O interface 124 for communicating with the exterior of the token 12 and at least one microprocessor 126, as means for processing data, which are internally linked together through a control and data bus 123.

The token 12 stores and carries out one or several security functions.

The security functions may include a user authentication process to be used, in order to access data and/or an application(s) managed by the token 12 and/or the server 18 to be addressed.

To authenticate the user, the token 12 may store an application for verifying a PIN. The PIN is securely stored within the chip memory 122 and to be input by a token 12 user. The token 12 compares input data with the stored PIN and, when the input data matches with the stored PIN, authorizes a running of the application, such as an application for authenticating a token 12.

The security functions include preferentially an encryption/decryption process. The encryption/decryption process is to be used for exchanging data, through the PC 14, with the server 18. Before sending any data, the data is encrypted by using a key and an encryption algorithm.

The algorithms for encrypting/decrypting data are shared between the token 12 and the server 18.

The encryption/decryption process is to be used before sending, through the PC 14, to the server 18, data and, after receiving, through the PC 14, from the server 18 data respectively, so as to protect an access to the data thus exchanged.

The chip memory 122 can be constituted by one or several EEPROM (acronym for "Electrically Erasable Programmable Read-Only Memory"), one or several ROM (for "Read Only Memory"), one or several Flash memories, as non-volatile memory(ies), and/or any other memory(ies) of different types, like one or several RAM (for "Random Access Memory"), as volatile memory(ies).

The chip memory 122 stores preferably a private key that is used for generating authentication data. The chip memory 122 stores a session extension key, as an associated public key, that is associated with the private key.

The chip memory 122 stores preferably, besides an OS, at least one authentication application algorithm accessible from outside, in particular, through the script, from the server 18. The authentication application algorithm allows, when executed by the chip microprocessor 126, generating authentication data and requesting the PC 14 (and more exactly, through the script, the client) to send one (or several) message(s) along with the generated authentication data and possibly additional information.

The authentication application algorithm may be written in an object-oriented language, such as Java, also termed applet when developed in Java. According to such a corresponding embodiment, the chip memory 122 stores a Java Virtual Machine (or JVM) that interprets and executes the applet.

To generate the authentication data, the authentication application uses preferably a challenge (generated by either the token 12 or the server 18) and the private key associated with the session extension key, as two inputs to an encryption algorithm, such as a Data Encryption Standard (or DES), a triple DES or a Rivest Shamir and Adleman (or RSA) with a selected key length, like 1024 or more. The thus generated authentication data, as a resulting cryptogram, constitutes a signed challenge also termed a signature of the challenge.

When the token 12 signs the challenge and sends to the client (and more exactly the script) the signature of the challenge, it ensures that the token 12 is effectively coupled to the PC 14 and therefore present.

As soon as the token 12 is no more present, the client (thanks to the script) is no more able to submit authentication data to the server 18. Accordingly, the server 18 forbids its interlocutor to continue the open communication session between the client and the server 18 by sending preferably to its interlocutor a message for indicating that the open communication session is terminated.

The challenge is used, for the preferred described embodiment, for generating corresponding authentication data. When the challenge is provided by the server 18 and has to be received by the token 12 before generating authentication data. A corresponding request of the challenge that is issued by the client therefore has to be sent before the expiration time. When the extension time is to be at least once updated by further requesting another challenge, the client polls the server 18 with a time period value that is less than the extension time period value. The time period value of such a polling may be preferably equal to the extension time period value. The polling is to be executed, before the expiration time minus an estimated maximum time to retrieve the challenge and submit the corresponding authentication data.

As additional information, there may be a certificate. The certificate may comply with a format defined by, for example, the X.509 type specifications. The certificate contains a session extension key, as a public key. The private key is stored securely within the chip memory 122. The private key is a key associated with the certificate public key.

As additional information, there may be contextual information. The chip memory 122 stores, preferably in a secure manner, the contextual information, such as an identifier of the server 18, as an addressee of the message(s) to be sent from the client.

The chip I/O interface 124 includes one I/O interface for exchanging data with the host computer, namely the PC 14, while using preferably APDU.

The chip I/O interface 124 with the PC 14 may use a SWP, an IP, a USB protocol, a BIP and/or another data communication protocol(s).

The chip I/O interface 124 may include additional I/O interface(s), so as to communicate with other external respective entity(ies).

The chip microprocessor 126 processes data originating from and/or intended to any internal component and data originating from and/or intended to any external device through the chip I/O interface 124.

The chip microprocessor 126 executes, besides an OS, preferably an authentication application that is accessible, i.e. can be launched, from the PC 14, and more exactly the script executed by the PC 14.

The chip microprocessor 126 executes, besides the OS and the authentication application, preferably a user authentication application.

The user authentication application allows, when executed by the chip microprocessor 126, authenticating a token user at least once, for example, after a connection to the server 18 for logging in onto the server 18. The token user authentication verifies preferably that the token user has given, through a PC MMI(s), data that matches with expected data, such as a PIN and/or biometrics print(s), stored previously, preferably in a secure manner, within the chip memory 122.

The server 18 is remote, i.e. accessible through at least one communication network, such as an Intranet network, an Internet network and/or a mobile radio-communication network.

According to an alternative, the server 18 is local. For example, the server 18 is embedded within the PC 14.

The server 18 may be operated or managed by a Mobile Network Operator (or MNO), a Mobile Virtual Network Operator (or MVNO), a banking Operator, a wire communication network operator, a service Operator or on behalf of a service Operator, as a service provider.

The server 18 comprises at least one I/O interface (not represented) for communicating with the exterior of the server 18 and at least one microprocessor (not represented), as means for processing data, which are internally linked together.

The server 18 may comprise at least one memory.

The server 18 stores and carries out preferably one or several security functions. The security functions may include a sending to a token, accessed through a script embedded within a web page, of a request for carrying out a user authentication process to be used, in order to access data and/or an application(s) managed by the token 12 and/or the server 18 to be addressed.

The security functions include preferentially an encryption/decryption process. The encryption/decryption process is to be used for exchanging data, through the PC 14, with the token 12. Before sending any data, the data is encrypted by using a key and an encryption algorithm.

The algorithms for encrypting/decrypting data are shared between the token 12 and the server 18.

The encryption/decryption process is to be used before sending, through the PC 14, to the token 12, data and, after receiving, through the PC 14, from the token 12 data respectively, so as to protect an access to the data thus exchanged.

The server memory stores preferably, besides an OS, at least one authentication application algorithm accessible from the server 18 microprocessor. The authentication application algorithm allows, when executed by the server 18 microprocessor, generating authentication data, comparing received data with the generated authentication data and sending preferably one (or several) message(s) along with a result of the comparison between the received data and the generated authentication data.

The server 18 is preferably connected, through a bi-directional link 19, to a memory 110.

The memory 110 stores a database. The database registers, at least for each pending open communication session, a value of the last challenge sent to the client 14, a value of a session extension key, and a value of a corresponding expiration time.

The database also registers, at least for each pending open communication session, preferably a value of an identifier of the open communication session, a value of a challenge associated with the thus identified open communication session.

The session extension key is preferably provided to (or generated by) the server 18 before a verification of data received from the interlocutor.

The server 18 uses preferentially the certificate that is received, through the client, from the token 12. The received certificate containing the session extension key, as public key, allows the server 18 to determine whether the private key of the token 12 has been used or not for generating a cryptographic result, as the signature of the challenge.

The session extension key is used by the server 18 to verify whether the data received from an interlocutor, as the client, for the open communication session, matches with authentication data generated by the server 18.

A matching of the data received by the server 18 with the authentication data, as reference data, generated by the server 18, allows the server 18 to extend the open communication session with its interlocutor.

To authenticate its interlocutor, the server 18 uses the session extension key, as an input to an encryption or decryption algorithm, such as a DES, a triple DES or an RSA with a selected key length, like 1024 or more. The thus generated authentication data constitutes a resulting cryptogram to be also obtained and submitted by an interlocutor of the server 18 for further communication.

The server 18 has to receive, from its interlocutor, data matching with the reference data, so that the server 18 allows its interlocutor to discuss until an expiration time to be determined.

The server 18 is arranged to authorize (or forbid) its interlocutor to further exchange data while generating an expiration time each time the server 18 authenticates its interlocutor, as client. The authentication of the client means that the server 18 verifies that data supplied by its interlocutor corresponds to the generated authentication data.

To generate an expiration time, the server 18 adds preferably to a time at which the client has open a communication session with the server 18 a predefined extension time period. The server 18 triggers a communication session timer preferably as soon as a client is logged on the server 18.

Preferably, the predefined extension time period is short. Such a short predefined extension time period forces an interlocutor, namely a client, to authenticate regularly before the server 18, so as to be allowed to go on, in a progressive manner, communicating with the server 18.

The server 18 processes any request issued by the client while the expiration time has not elapsed. Otherwise, i.e. when the expiration time has elapsed, the server 18 does not process any request originating from the client.

As soon as the client does not submit authentication data expected by the server 18, the server 18 closes the open communication session at the end of a last calculated expiration time.

Such a closing may be due to a non-submission of expected authentication data or a submission of unexpected authentication data. Thus, even if a PC user forgets to activate a "logout" button to close the open communication session, then the server 18 closes automatically the open communication session. The communication session is thus stopped and not left open for any unauthorized and possibly malicious user and/or application (or any software component).

When the server 18 authorizes to extend an open communication session for a first time, the server 18 extends the open communication session, once by the predefined extension time period, to an expiration time corresponding to a time at which the communication session is open completed by one extension time period.

When the server 18 authorizes to extend an open communication session for at least another time, the open communication session is extended at least by the predefined extension time period from the last calculated expiration time. The open communication session may be thus further periodically extended while the client sends to the server 18 expected authentication data.

Figure 2:
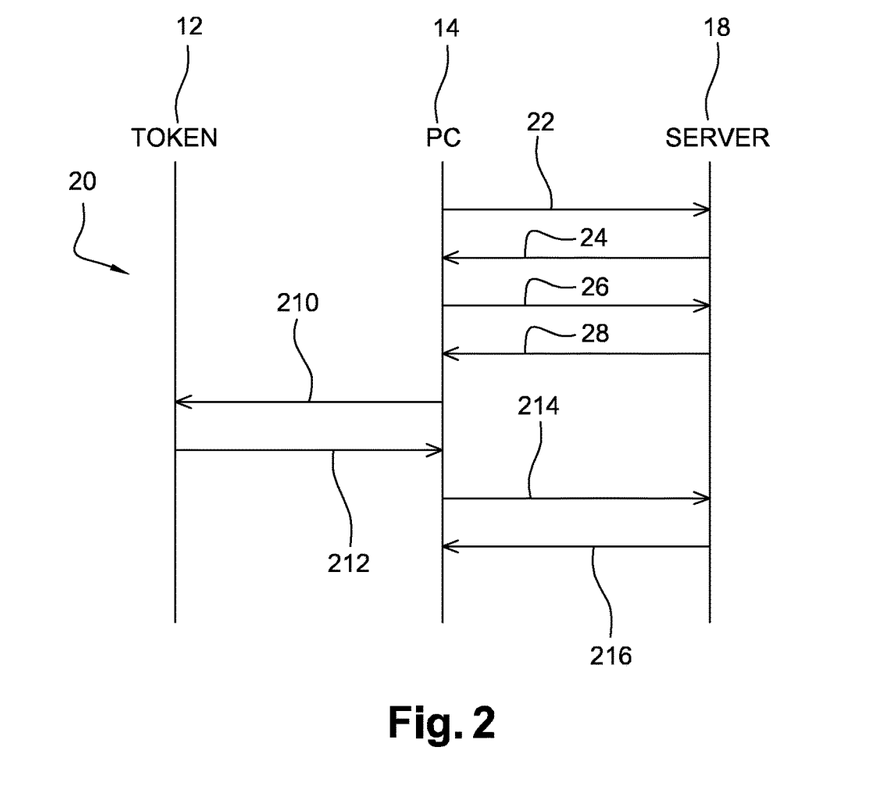
FIG. 2 represents an example of a flow of messages exchanged between the token, the terminal and the server of the system of FIG. 1, so that the server does or does not authorize the client to continue, for a predetermined extension time period, the open communication session thanks to authentication data submitted or not by the token, through the client, to the server respectively.

FIG. 2 depicts an example of a message flow 20 that involves the token 12, the PC 14, as client, and the server 18, for one extension time period of an open communication session between the PC 14 and the server 18.

It is assumed that a PC user owns a smart card, as the token 12.

The PC 14 runs a browser, as client, to access the server 18, for example, further to a launching, by the PC user, through a PC MMI, of an execution of the browser.

Optionally, once the client is connected to the server 18, the server 18 involves the token 12 by using a browser extension, in order that the token 12 authenticates the token user before the client logs in to the server 18. Such a solution, also known as SConnect and described notably in U.S. Pat. No. 7,748,609 B2, allows accessing, from the server 18, a function(s) and data of the token 12. To address the token 12 from the server 18, a browser extension, as application, is firstly installed within the browser. The browser extension provides a scripting Application Program Interface (or API) to communicate with the token 12. A script can then be issued from the server 18 and embedded within a page served by the server 18. The script brings to the page loaded from the server 18 an application code that communicates with the token 12 (by using the browser extension API) and the server 18.

When the client 14 connects to the server 18, the server 18 generates a cookie, as an identifier of the open communication session. The cookie is an information bit string. To generate a cookie, the server 18 may use a random generation algorithm. The cookie includes an identifier of the server 18, as an addresser of the generated cookie. The server 18 sends the generated cookie to the client 14. The client 14, when addressing the server 18, has to use the generated cookie when the client sends to the server 18 any data during the open communication session. Otherwise, the server 18 rejects an access to its interlocutor which does not provide the cookie. The cookie is used as an evidence allowing to authenticate the client, as an interlocutor of the server 18.

As soon as the client is logged in to the server 18, the server 18 sends a page comprising a script for requesting to the server 18 another script for extending an open communication session. The two scripts are to be interpreted by a script engine supported by the PC 14 and executed by the PC 14 microprocessor.

Once the client 14 has received the script for requesting to the server 18 another script for extending an open communication session, the client sends to the server 18 a request 22 for obtaining a script for extending an open communication session, such as, for example, "Get session-extension script".

Further to a receipt of the request 22 for obtaining a script for extending an open communication session, the server 18 starts the communication session timer. The communication session timer is set to count up from zero to a predetermined extension time period value. Alternately, the communication session timer is set to count down from a predetermined extension time period value.

The predetermined extension time period value is short, i.e. less than few minutes. Preferentially, the predefined extension time period value is less than one minute. The predefined extension time period value is set, for example, to 30 s. The open communication session is prolonged from a time value at which the communication session is open with the extension time period value.

Then, the server 18 sends back to the client 14 a page including a script 24 for extending an open communication session.

For example, the script 24 for extending an open communication session is as follows:

```
<!DOCTYPE html PUBLIC "-//W3C//DTD HTML 3.2//EN">
<html>
<head>
<meta http-equiv="content-type" content="text/html; charset=UTF-8">
 <script src="sconnect.js"></script>
 <script src="sha1.js"></script>
 <script src="padding.js"></script>
 <script>
     // Get SConnect reference
     var scardComm = new SConnect.PCSC( );
     // this function starts the session extension dialog with the server
     function extendSession( ) {
        // send challenge request to server
        var challengeRequest = new XMLHttpRequest( );
        challengeRequest.open("GET",
http://www.myserver.com/session/getchallenge");
        challengeRequest.onreadystatechange = function( ) {
           if ((challengeRequest.readyState == 4) &&
(challengeRequest.status == 200)) {
              // we have received the challenge from the server,
now we need to sign it
              // compute the SHA-1 digest of the random
              var hashedRandom =
Sha1.digest(challengeRequest.responseText);
              var paddedHash = encodeHashForSigning(hashedRandom);
              // send smart card APDU for signing (RSA-1024 and Key 9C)
              var resp =
scardComm.exchangeAPDU("00879C887C81858200818180" +
paddedHash);
              if (resp.statusWord == "9000") {
                 // we now have the signature, send it to server:
                 var authRequest = new XMLHttpRequest( );
                 // append authentication data to the HTTP request URL
                 authRequest.open("GET",
"http://www.myserver.com/session/authData?data="+resp.dataOut);
                 authRequest.onreadystatechange = function( ) {
                    if ((authRequest.readyState == 4) &&
                       (authRequest.status == 200))
{
                       // Success! we extended the session
                       // Register the next session extension in 30 seconds
                       setTimeout ( "extendSession( )", 30000 );
                    }
                 }
              }
           }
        }
     }
     // connect to inserted card
     if (scardComm.connect(listReaders(1)[0])) {
        // select the card's signing application
        scardComm.exchange-
        APDU("00A404000BA00000030800010000100");
        extendSession( );
     }
 </script>
 </head>
 <body>
 You are logged in
 </body>
</html>
```

The script 24 for extending an open communication session may include the following operations to be executed by the PC 14 microprocessor:
  a sending, to the server 18, of a request of a challenge,
  a receipt of a challenge (originating from the server 18),
  a determination of a hashed challenge,
  a formatting of the hashed challenge,
  a sending, to the token 12, of an APDU command for requesting the token 12 to sign a formatted hashed challenge,
  a receipt of a corresponding signature (originating from the token 12),
  a sending, to the server 18, of a request of authenticating data along with the corresponding signature,
  a receipt of a result (originating from the server 18) relating to the sent authentication request, a setting of an expiration timer to a predefined expiration time period value, only if the result corresponds to a success, i.e. the authentication of the sent signature matches with the expected authentication data generated by the server 18, and in such a case, the above listed operations will be repeated at least once after an expiration of the expiration timer.

The expiration timer is set to count up from zero to the predefined expiration time period value. Alternately, the expiration timer is set to count down from the predefined expiration time period value to zero.

The predefined expiration time period value is short like, for example, 30 s.

Prior to the above listed operations, it may be required to select the authentication application to be run on the token 12.

Before an expiration of the expiration time period value, the client 14 sends to the server 18 a request 26 for obtaining a challenge, such as, for example, "Get new challenge".

Once the server 18 receives the request 26 for obtaining a challenge, the server 18 generates, for example, a random, as a challenge. The challenge may alternately be a result of an OTP generation algorithm, such as an HMAC-based OTP.

The server 18 stores the last generated challenge. The server 18 may also store a time at which the challenge is requested.

The server 18 sends back to the client 14 the last generated challenge 28, as response to the request 26 for obtaining a challenge, so as to allow its interlocutor to supply the server 18 with corresponding authentication data.

As soon as the client 14 receives the challenge, the client 14 determines a hashed challenge, so as to adapt the size of the generated challenge to a sufficiently reduced size. Such a reduced size of the generated challenge allows the generated challenge to be processed by the token 12 (that has generally reduced data processing capacity with respect to a terminal computer). Then, the client 14 formats the resulting hashed challenge. The client 14 obtains thus a formatted hashed challenge.

Then, the client 14 sends to the token 12 an APDU command 210 for requesting the token 12 to sign the formatted hashed challenge.

Optionally, the client 14 sends to the token 12 further contextual information, for example, information relating to the server 18, such as an identifier of the server 18, like its IP address, its domain name, and/or its name. Such a sending of further contextual information may be performed by concatenating to the information relating to the challenge the further contextual information.

When coupled to the PC 14, the token 12 generates a corresponding signature, as authentication data, by encrypting the formatted hashed challenge while using an encryption algorithm and a private key relating to the token 12. The signature may be compliant with a standard, such as PKCS 1 as described at the following site http://www.rsa.com/rsalabs/inode.asp?id.2125.

The token 12 sends back to the client 14 the generated signature 212, as authentication data, accompanied with a certificate including a public key, as session extension key, corresponding to the private key stored within the token 12.

The session extension key is preferably a dedicated key. According to another embodiment, the session extension key is a key for logging in to the server 18.

Alternatively, instead of a public key, the session extension key is a secret key that is either pre-shared with the token 12 or generated by the server 18 and by the token 12 while using the same data.

Alternately, instead of providing the session extension key and the authentication data at the same time, the token 12 transmits the session extension key, through the client 14, to the server 18 before a transmission of the authentication data. A transmission of the session extension key may occur, for example, during a login phase between the client 14 and the server 18.

According to another embodiment, instead of the token 12, another server, as a back-end system, provides the server 18 with the session extension key before a verification (carried out by the server 18) of received data with respect to expected authentication data.

The client 14 receives a corresponding generated signature and the certificate. The client 14 stores the certificate.

Then, the client 14 sends, to the server 18, a request 214 for authenticating data accompanied with the corresponding generated signature and the certificate.

The server 18 (and more exactly an authentication application run by the server 18) receives the corresponding generated signature and the certificate. The server 18 extracts from the certificate the session extension key.

The server 18 analyses whether data received (or not) from its interlocutor does or does not correspond with last stored authentication data, so as to let or block a further access to the server 18.

If the token 12 is not or no more coupled to the PC 14, the server 18 does not receive any data, through the client 14, from the token 12, then the server 18 closes automatically the open communication session. The open communication session is stopped reducing therefore a risk of being attacked by an unauthorized user and/or software.

The server 18 decrypts preferentially data, as signature of a challenge, received from its interlocutor, by using the session extension key. The server 18 obtains decrypted data to be compared with the generated stored challenge, as authentication data. If the decrypted data is the generated challenge, then the authentication is successful and the server 18 authorizes to continue an exchange of data with its interlocutor by generating another challenge and re-starting a communication session timer.

When the authentication is successful, the server 18 allows saving within the database stored within the memory 110 at least the identifier of the open communication session associated with the last generated challenge and the last received session extension key, as registered data.

Otherwise, i.e. if either no data is received by the server 18 or the decrypted data is not the generated challenge, then the interlocutor is not authenticated and the server 18 forbids to further exchange data with its interlocutor by closing automatically the open communication session.

Based upon a result of the comparison carried out by the server 18, the server 18 sends back preferably to the client 14 a message 216 including a comparison result, i.e. either the authentication is successful or the authentication has failed.

While the PC user needs to exchange, through the client 14, with the server 18, and the token 12 is present, the PC 14 (microprocessor) executes the script for extending an open communication session by repeating the herein above stated operations. More exactly, the PC 14 periodically requests and obtains, from the server 18, a new challenge, requests and obtains, from the token 12, a corresponding signature and submits the signature to the server 18 and receives a corresponding successful authentication result. For each authorized time extension, the server 18 computes a corresponding expiration time value of the open communication session by adding to the last expiration time value a predetermined extension time period value. The client 14 and the server 18 exchange, on the one hand, further requests 26 for obtaining a challenge and 214 for authenticating data and corresponding responses 28 and 216 and, on the other hand, the client 14 and the token 12 exchange further command 210 for requesting the token 12 to sign the formatted hashed challenge and corresponding response 212.

Once the last generated expiration time value (stored at the server 18 side) for the open communication session is reached, the server 18 does not respond to any further request originating from the client 14. The server 18 may send back to the client 14 a message for informing this latter that the open communication session arrives at the end of the session. The end of the communication session is the last extension time value. The last extension time value is either the first session extension time value or a further session extension value.

The server 18 verifies during the open communication session whether a request originating from the client 14 is received before the communication session timer reaches the last generated expiration time. If yes, the server 18 replies to the received request.

There is, thanks to the invention, no need to trust the client 14 to maintain an open communication session between the client 14 and the server 18. As a matter of fact, the server 18 closes automatically the open communication session as soon as expected authentication data is not submitted by the client 14.

A lot of amendments of the embodiment described supra may be brought without departing from the spirit of the invention.

For example, according to a first embodiment, once logged in to the server 18, the session extension script is incorporated into each page served by the server 18. However, such a first embodiment implies to establish a communication between the PC 14 and the token 12 for each page slowing thus down a rendering of each page.

According to a second embodiment, once logged in to the server 18, the session extension script is incorporated only into one page loaded from the server 18 and kept open during the open communication session. Such a use of a single page, as a pop-up window, allows minimizing communication of data between the PC 14 and the token 12. The pop-up window may include a dedicated "logout" button allowing, when depressed, to close explicitly the open communication session. To open the pop-up window during the logging in to the server 18, it may be a script window.open ("http://www.myserver.com/extend-session","session-window").

The invention claimed is:

1. A method for communicating between a server and a client, wherein the server and the client access at least one session extension key and/or a key associated with the session extension key, as an associated key, the method comprising:
the client sends to the server, during an open communication session having an associated end time, client authentication data, the client authentication data being generated by using the session extension key or the associated key, the client authentication data being related to the client, and the client authentication data allowing the server to authenticate at least the client on a basis of the session extension key or the associated key;
once the server authenticates successfully the client based upon the client authentication data and the session extension key:
the server generates an expiration time, wherein the expiration time is a time at which the open communication session is completed by a predetermined extension time period; and
the server authorizes to extend the end time of the open communication session with the client until the expiration time, wherein the predetermined extension time period is the difference between the expiration time and the end time of the open communication session.

2. Method according to claim 1, wherein, prior to the authentication of at least the client by the server, the client sends to the server at least one challenge request, and the server sends to the client a challenge, as a response to the challenge request, wherein the server and the client use the challenge to generate the client authentication data.

3. Method according to claim 1, wherein, prior to the authentication of at least the client by the server, the client and the server use pre-shared secret data and a predetermined algorithm, so as to generate independently a corresponding challenge, wherein the server and the client use the challenge to generate the client authentication data.

4. Method according to claim 2, wherein the client and the server use contextual information, the session extension key or the associated key, the challenge and a predetermined algorithm, so as to generate the client authentication data.

5. Method according to claim 2, wherein the server sends to the client a script, the script receives the challenge, the script sends to the authentication application the challenge, the authentication application uses the challenge, the session extension key or the associated key, and a predetermined algorithm to generate the client authentication data, and the authentication application sends to the script the generated client authentication data.

6. Method according to claim 5, wherein, a token is coupled to a terminal, as the client, the token storing the session extension key and/or the associated key, and the token supports the authentication application.

7. Method according to claim 1, wherein the client sends to the server, besides the generated client authentication data, data relating to the session extension key.

8. A server for communicating with a client,
wherein the server accesses at least one session extension key and/or a key associated with the session extension key, as an associated key,
the server is configured to receive, during an open communication session having an associated end time, client authentication data, the client authentication data originating from the client or passing through the client, the client authentication data being related to the client, the client authentication data allowing the server to authenticate at least the client on a basis of the session extension key or the associated key,
once the server authenticates successfully the client based upon the client authentication data and the session extension key:
the server is configured to generate an expiration time, the expiration time being a time at which the open communication session is completed by a predetermined extension time period, and
the server is configured to authorize to extend the end time of the open communication session until the expiration time, wherein the predetermined extension time period is the difference between the expiration time and the end time of the open communication session.

9. A client for communicating with a server,
wherein the client accesses at least one session extension key and/or one key associated with one session extension key, as an associated key,
the client is configured to send, during an open communication session having an associated end time, to the server client authentication data, the client authentication data being generated by using the session extension key or the associated key, the client authentication data being related to the client, and the client authentication data allowing the server to authenticate at least the client on a basis of the session extension key or the associated key, and
the client is authorized, by the server, to continue communication with the server until an expiration time, the expiration time being a time generated by the server at which the open communication session is completed by a predetermined extension time period, wherein the predetermined extension time period is the difference between the expiration time and the end time of the open communication session.

10. A communicating system comprising a server and a client,
wherein the server and the client access at least one session extension key and/or one key associated with one session extension key, as an associated key,
the client is configured to send to the server during an open communication session having an associated end time, client authentication data, the client authentication data being generated by using the session extension key or the associated key, the client authentication data being related to the client, and the client authentication data allowing the server to authenticate at least the client on a basis of the session extension key or the associated key,
once the server authenticates successfully the client based upon the client authentication data and the session extension key:
 the server is configured to generate an expiration time, the expiration time being a time at which the open communication session is completed by a predetermined extension time period, and
 the server authorizes to extend the end time of the open communication session with the client until the expiration time, wherein the predetermined extension time period is the difference between the expiration time and the end time of the open communication session.

* * * * *